(12) United States Patent
Wu et al.

(10) Patent No.: US 11,866,594 B2
(45) Date of Patent: Jan. 9, 2024

(54) ELASTOMERIC SHAPE MEMORY POLYMER COMPOSITES (71) Applicants: Lawrence Livermore National Security, LLC, Livermore, CA (US); Stephanie Schulze, Lenexa, KS (US)

(72) Inventors: Amanda Wu, Dublin, CA (US); Taylor Maxwell Bryson, Newbury Park, CA (US); Eric Duoss, Dublin, CA (US); Thomas R. Metz, Tracy, CA (US); Ward Small, Livermore, CA (US); Thomas S. Wilson, San Leandro, CA (US); Stephanie Schulze, Lenexa, KS (US); Emily Cheng, Ballwin, MO (US)

(73) Assignees: Lawrence Livermore National Security, LLC, Livermore, CA (US); Stephanie Schulze, Lenexa, KS (US)

( * ) Notice: Subject to any disclaimer, the term of this patent is extended or adjusted under 35 U.S.C. 154(b) by 1018 days.

(21) Appl. No.: 16/610,215

(22) PCT Filed: Jun. 27, 2018

(86) PCT No.: PCT/US2018/039857
§ 371 (c)(1),
(2) Date: Nov. 1, 2019

(87) PCT Pub. No.: WO2019/006029
PCT Pub. Date: Jan. 3, 2019

(65) Prior Publication Data
US 2020/0109300 A1 Apr. 9, 2020

Related U.S. Application Data (60) Provisional application No. 62/525,493, filed on Jun. 27, 2017.

(51) Int. Cl.
C09D 11/102 (2014.01)
C09D 11/037 (2014.01)
(Continued)

(52) U.S. Cl.
CPC .......... C09D 11/102 (2013.01); B29C 64/106 (2017.08); B33Y 10/00 (2014.12);
(Continued)

(58) Field of Classification Search
CPC .............................................. B29K 2105/165
See application file for complete search history.

(56) References Cited

U.S. PATENT DOCUMENTS 3,917,526 A    11/1975  Jennings
4,582,756 A *   4/1986  Niinuma .................... C08J 9/32
                                                         428/313.5
(Continued)

FOREIGN PATENT DOCUMENTS

GB        990235 A      4/1965
WO    2006086011 A2     8/2006
(Continued)

OTHER PUBLICATIONS

Lendlein et al., "Shape-Memory Effect," Angewandte Chemie International Ed., vol. 41, 2002, pp. 2034-2057.
(Continued)

Primary Examiner — Ian A Rummel
(74) Attorney, Agent, or Firm — Zilka-Kotab, P.C.

(57) ABSTRACT

In accordance with one aspect of the presently disclosed inventive concepts, a product includes a porous three-dimensional (3D) printed polymer structure having elastomeric shape memory, where the structure includes a material comprising a plurality of gas-filled microballoons. The 3D printed polymer structure has hierarchical porosity.

21 Claims, 7 Drawing Sheets (51) Int. Cl.
| | |
|---|---|
| *B33Y 10/00* | (2015.01) |
| *B33Y 70/10* | (2020.01) |
| *B33Y 80/00* | (2015.01) |
| *B29C 64/106* | (2017.01) |
| *G06F 9/32* | (2018.01) |
| *G06F 9/48* | (2006.01) |
| *G06F 9/54* | (2006.01) |
| *B29K 105/16* | (2006.01) |
| *B29K 509/02* | (2006.01) |

(52) U.S. Cl.
CPC ............... *B33Y 70/10* (2020.01); *B33Y 80/00* (2014.12); *C09D 11/037* (2013.01); *G06F 9/321* (2013.01); *G06F 9/4812* (2013.01); *G06F 9/4881* (2013.01); *G06F 9/546* (2013.01); *B29K 2105/165* (2013.01); *B29K 2509/02* (2013.01)

(56) References Cited

U.S. PATENT DOCUMENTS

| | | | |
|---|---|---|---|
| 4,906,518 | A | 3/1990 | Inabata |
| 8,097,336 | B2 | 1/2012 | Owens |
| 8,883,871 | B2 | 11/2014 | Wilson et al. |
| 9,340,654 | B2 | 5/2016 | Silverstein et al. |
| 10,494,470 | B2 | 12/2019 | Wilson et al. |
| 10,689,491 | B2 | 6/2020 | Durban et al. |
| 2004/0126322 | A1 | 7/2004 | Bichon et al. |
| 2012/0252324 | A1 | 10/2012 | Hreha et al. |
| 2015/0174826 | A1 | 6/2015 | Murugesh et al. |
| 2019/0100626 | A1 | 4/2019 | Durban et al. |
| 2019/0241684 | A1* | 8/2019 | Tsujino ..................... C08F 2/48 |
| 2020/0190345 | A1 | 6/2020 | Mabe et al. |
| 2020/0308428 | A1 | 10/2020 | Perez et al. |
| 2021/0269659 | A1 | 9/2021 | Nguyen et al. |
| 2021/0324217 | A1 | 10/2021 | Mabe et al. |
| 2022/0064481 | A1 | 3/2022 | Rodriguez et al. |

FOREIGN PATENT DOCUMENTS

| | | |
|---|---|---|
| WO | 2006136153 A1 | 12/2006 |
| WO | 2016149032 A1 | 9/2016 |
| WO | 2016187097 A1 | 11/2016 |
| WO | 2017086923 A1 | 5/2017 |

OTHER PUBLICATIONS

Ohki et al., "Mechanical and shape memory behavior of composites with shape memory polymer," Composites: Part A 35, 2004, pp. 1065-1073.

Lendlein et al., "Biodegradable, Elastic Shape-Memory Polymers for Potential Biomedical Applications," Science, vol. 296, May 31, 2002, pp. 1673-1676.

Li et al., "Thermomechanical characterization of a shape memory polymer based self-repairing syntactic foam," Polymer, vol. 51, 2010, pp. 755-762.

Shimazaki et al., "Shock-absorption properties of functionally graded EVA laminates for footwear design," Polymer Testing, vol. 54, 2016, pp. 98-103.

Mabe et al, U.S. Appl. No. 16/659,025, filed Oct. 21, 2019.
Durban et al., U.S. Appl. No. 15/721,528, filed Sep. 29, 2017.
Perez et al., U.S. Appl. No. 16/368,725, filed Mar. 28, 2019.
Perez et al., U.S. Appl. No. 17/499,641, filed Oct. 12, 2021.
Nguyen et al., U.S. Appl. No. 16/805,494 filed filed Feb. 28, 2020.
Mabe et al., U.S. Appl. No. 17/232,521, filed Apr. 16, 2021.
Lenhardt et al., U.S. Appl. No. 17/075,549, filed Oct. 20, 2020.
Lerebours et al., "The relationship between porosity and specific surface in human cortical bone is subject specific," Bone, vol. 72, 2015, pp. 109-117.

Drake, E., "Characterization of Viscoelastic Materials Through an Active Mixer by Direct-Ink Writing," Thesis, Oklahoma State University, May 2017, 117 pages.

Wu et al., "3D Printed Silicones with Shape Memory," Scientific Reports, Jul. 2017, 6 pages.

Shi et al., "Design and fabrication of graduated porous Ti-based alloy implants for biomedical applications," Journal of Alloys and Compounds, vol. 728, 2017, pp. 1043-1048.

Onal et al., "Mechanical Properties and In Vitro Behavior of Additively Manufactured and Functionally Graded Ti6Al4V Porous Scaffolds," Metals, vol. 8, 2018, pp. 1-21.

Ortega et al., "Active Mixing of Disparate Inks for Multimaterial 3D Printing," Advanced Materials Technologies, vol. 4, 2019, 13 pages.

Chen et al., "Porous Scaffold Design for Additive Manufacturing in Orthopedics: A Review," Frontiers in Bioengineering and Biotechnology, vol. 8, Jun. 2020, pp. 1-20.

Shalchy et al., "Hierarchical porosity in additively manufactured bioengineering scaffolds: Fabrication & characterisation," Journal of the Mechanical Behavior of Biomedical Materials, vol. 110, 2020, 12 pages.

Rodriguez et al., U.S. Appl. No. 17/522,677, filed Nov. 9, 2021.

Smay et al., "Collodial Inks for Directed Assembly of 3-D Periodic Structures," Langmuir, vol. 18, No. 14, 2002, pp. 5429-5437.

Beloshenko et al., "Shape-Memory Effect in Polymer Composites with a Compactible Filler," Mechanics of Composite Materials, vol. 39, No. 3, 2003, pp. 255-264.

Gratson et al., "Phase Behavior and Rheological Properties of Polyelectrolyte Inks for Direct-Write Assembly," Langmuir, vol. 21, No. 01, 2005, pp. 457-464.

Lewis, J., "Direct Ink Writing of 3D Functional Materials, " Advanced Functional Materials, vol. 16, 2006, pp. 2193-2204.

Therriailt et al., "Fugitive Inks for Direct-Write Assembly of Three-Dimensional Microvascular Networks," Advanced Materials, vol. 17, No. 4, Feb. 23, 2005, pp. 395-399.

Liu et al., "Review of progress in shape-memory polymers," Journal of Materials Chemistry, vol. 17, Mar. 19, 2007, pp. 1543-1558.

Small et al., "Biomedical applications of thermally activated shape memory polymers," Journal of Materials Chemistry, vol. 20, Mar. 2, 2010, pp. 3356-3366.

Cai et al., "Direct-writing construction of layered meshes from nanoparticles-vaseline composite inks: rheological properties and structures," Applied Physics A: Materials and Science Processing, vol. 102, 2011, pp. 501-507.

Hearon et al., "Post-Polymerization Crosslinked Polyurethane Shape Memory Polymers," Journal of Applied Polymer Science, vol. 121, Feb. 17, 2011, pp. 144-153.

Singhal et al., "Ultra Low Density and Highly Crosslinked Biocompatible Shape Memory Polyurethane Foams," Journal of Polymer Science Part B: Polymer Physics, vol. 50, No. 10, May 15, 2012. pp. 1-27.

Song et al., "Design and characterization of biocompatible shape memory polymer (SMP) blend foams with a dynamic porous structure," Polymer, vol. 56, 2015, pp. 82-92.

Damouny et al., "Hydrogel-filled, semi-crystalline, nanoparticle-crosslinked, porous polymers from emulsion templating: Structure, properties, and shape memory," Polymer, vol. 82, 2016, pp. 262-273.

Wang et al., "Recent developments in shape memory polymer nanocomposites: Actuation methods and mechanisms," Coordination Chemistry Reviews, vol. 320-321, Mar. 25, 2016, pp. 38-52.

Maiti et al., "3D printed cellular solid outperforms traditional stochastic foam in long-term mechanical response," Scientific Reports, vol. 6:24871, Apr. 27, 2016, pp. 1-8.

Duoss et al., "Three-Dimensional Printing of Elastomeric, Cellular Architectures with Negative Stiffness," Advanced Functional Materials, vol. 24, 2014, pp. 4905-4913.

Hearon et al., "Porous Shape-Memory Polymers," Polymer Reviews, vol. 53, 2013, pp. 41-75.

Singhal et al., "Ultra Low Density Amorphous Shape Memory polymer Foams," American Chemical Society, Mar. 19, 2012, 4 pages.

(56) References Cited

OTHER PUBLICATIONS

Therriault et al., "Rheological Behavior of Fugitive Organic Inks for Direct-Write Assembly," Applied Rheology, vol. 17, Issue. 01, 2007, pp. 10112:1-10112:8.
Zhang et al., "Mechanical, thermal insulation, thermal resistance and acoustic absorption properties of geopolymer foam concrete (GFC)," Cement and Concrete Composites, vol. 62, 2015, 35 pages, retrieved from http://eprints.whiterose.ac.uk/90607/1/Zhang%20et%20al.%20CCC%202015%20for%20WRRO.pdf.
Rodriguez et al., "In vivo tissue response following implantation of shape memory polyurethane foam in a porcine aneurysm," Journal of Biomedical Materials Research A, vol. 102. No. 5, May 2014, pp. 1-22.
Nam et al., "A Novel Fabrication Method of Macroporous Biodegradable Polymer Scaffolds Using Gas Foaming Salt as a Porogen Additive," John Wiley & Sons Inc., Journal of Biomedical Materials Research, vol. 53, 2000, pp. 1-7.
Muth et al., "Embedded 3D Printing of Strain Sensors within Highly Stretchable Elastomers," Advanced Materials, vol. 26, 2014, pp. 6307-6312.
Wehner et al., "An integrated design and fabrication strategy for entirely soft, autonomous robots," Nature, vol. 536, Aug. 25, 2016, pp. 451-455.
Gladman et al., "Biomimetic 4D printing," Nature Materials, vol. 15, Apr. 2016, pp. 413-418.
Javey et al., "Layer-by Layer Assembly of Nanowires for Three-Dimensional, Multifunctional Electronics," Nanoletters, vol. 07, No. 03, 2007, pp. 773-777.
Kim et al., "Stretchable and Foldable Silicon Integrated Circuits," Science, vol. 320, Apr. 25, 2008, pp. 507-511.
Liu et al., "Three-dimensional photonic metamaterials at optical frequencies," Nature Materials, vol. 07, Jan. 2008, pp. 31-37.
Ge et al., "Multimaterial 4D Printing with Tailorable Shape Memory Polymers," Scientific Reports, vol. 6:31110, Aug. 8, 2016, pp. 1-11.
Khoo et al., "3D printing of smart materials: A review on recent progresses in 4D printing," Virtual and Physical Prototyping, vol. 10, No. 03, 2015, pp. 103-122.
Jang et al., "Fabrication and deformation of three-dimensional hollow ceramic nanostructures," Nature Materials, vol. 12, Oct. 2013, pp. 893-898.
Meza et al., "Strong, lightweight, and recoverable three-dimensional ceramic nanolattices," Science, vol. 345, Issue. 6202, Sep. 12, 2014, pp. 1322-1326.
Bauer et al., "High-strength cellular ceramic composites with 3D microarchitecture," Proceedings of the National Academy of Sciences, vol. 111, No. 07, Feb. 18, 2014, pp. 2453-2458.
Zheng et al., "Ultralight, Ultrastiff Mechanical Metamaterials," Science, vol. 344, Issue 6190, Jun. 20, 2014, pp. 1373-1377.
Meza et al., "Resilient 3D hierarchical architected metamaterials," Proceedings of the National Academy of Sciences: Early Edition, Sep. 2015, pp. 1-6.
Zhu et al., "Catenary shape evolution of spanning structures in direct-write assembly of colloidal gels," Journal of Materials Processing Technology, vol. 212, 2012, pp. 727-733.
Lewis et al., "Direct writing in three dimensions," Materials Today, Jul.-Aug. 2004, pp. 32-39.
Wilson et al., "Shape memory polymers based on uniform aliphatic urethane networks," Journal of Applied Polymer Science, Jan. 23, 2007, 36 pages, retrieved from https://www.semanticscholar.org/paper/Shape-memory-polymers-based-on-uniform-aliphatic-Wilson-Bearinger/f494e9e9c50c034807ca437ab254b0dacd179e08.
Wagner et al., "Shear thickening in colloidal dispersions," Physics Today, vol. 62, No. 10, Oct. 2009, pp. 27-32.
Lewis et al., "Well-Defined Shape-Memory Networks with High Elastic Energy Capacity," Macromolecules, vol. 48, Jul. 15, 2015, pp. 4918-4926.
Zheng et al., "Multiscale metallic metamaterials, " Nature Materials, 2016, pp. 1-26.
International Search Report and Written Opinion from PCT Application No. PCT/US2018/039857, dated Nov. 5, 2018.
International Preliminary Report from PCT Application No. PCT/US2018/039857, dated Jan. 9, 2020.

\* cited by examiner

FIG. 4A  FIG. 4B  FIG. 4C  FIG. 4D  FIG. 4E  FIG. 4F (middle)  FIG. 4G (bottom)

FIG. 6A
FIG. 6B
FIG. 6C
FIG. 6D
FIG. 6E (middle)
FIG. 6F (bottom)

FIG. 7

ELASTOMERIC SHAPE MEMORY POLYMER COMPOSITES

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to elastomers, and more particularly, this invention relates to elastomers embedded with gas-filled polymer microballoons.

BACKGROUND

Process development and fabrication of stochastic elastomeric foams is driven by diverse applications requiring advanced structural performance facilitated by both closed cells (e.g., shock absorption, acoustic damping and thermal insulation) and open cells (e.g., biocompatible membranes, tissue engineering scaffolds, semi-permeable membranes for materials separation and food processing).

However, stochastic foams may not provide long-term mechanical performance because stochastic foams have a tendency to result in higher local stress concentrations which thereby result in localized material failure. It would be desirable to create ordered porous structures that are predictable, reproducible, and have potential for architectural complexity.

A three dimensional (3D) printing process, also known as direct ink writing (DIW), can form layer-by-layer manufacture of ordered, porous structures whose mechanical behavior is driven by architecture and material properties. Recently, 3D printing of silicones has been used to create mechanical energy absorbing materials with negative stiffness, vascularized tissue constructs, stretchable sensors, soft robotics, and shape morphing materials. These advances are made possible by the flexible and stretchable nature of silicone elastomers, combined with the unique structural and compositional control enabled via 3D printing.

Applications benefitting from structurally engineered porosity created by 3D printing include engineered tissue scaffolds, photolithographic patterned nanowire growth for tailored electronics, and nanolithography metamaterials with a negative refractive index for cloaking and superlensing applications, engineered with unit cells smaller than the wavelength of light.

Further spatial and temporal control can be achieved by 3D printing with shape memory polymers. Since their development, polymers with shape memory behavior have found applications in self-repairing components, high performance textiles, and surgical medicine. Recently, shape memory polymers with elastomeric behavior at elevated temperatures have shown promise with very large strain and energy storage capacities.

In the field of net-shape processing, it would be desirable to incorporate the enhanced tunability and functionality of shape memory behavior to 3D printed objects, thereby enabling controlled structural deformation to occur post-processing. Moreover, it would be desirable to imbue 3D printed objects with an additional dimension, such as time, wherein the 3D printed objects change their configuration in response to external stimuli.

SUMMARY

In accordance with one aspect of the presently disclosed inventive concepts, a product includes a porous three-dimensional (3D) printed polymer structure having elastomeric shape memory, where the structure includes a material comprising a plurality of gas-filled microballoons. The 3D printed polymer structure has hierarchical porosity.

In accordance with another aspect of the presently disclosed inventive concepts, an ink for additive manufacturing includes a matrix material, a filler, and a plurality of gas-filled microballoons.

In accordance with yet another aspect of the presently disclosed inventive concepts, a method includes extruding a mixture comprising a matrix material, a filler, and a plurality of gas-filled microballoons through a nozzle for forming a structure having hierarchical porosity, and curing the mixture in the formed structure to at least a predefined extent.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 6B is a bar graph of shape memory recovery following thermal soak under compressive strain at 70° C.

for 70 hours of 3D printed structures of matrix (neat resin), matrix+$T_g$44 microballoons (40 vol % $T_g$44), and matrix+$T_g$113 microballoons (40 vol % $T_g$113), according to various approaches.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" when combined with a value refers to plus and minus 10% of the reference value. For example, a length of about 1 μm refers to a length of 1 μm±0.1 μm.

It is also noted that, as used in the specification and the appended claims, wt % is defined as the percentage of weight of a particular component is to the total weight/mass of the mixture. Moreover, mol % is defined as the percentage of moles of a particular component to the total moles of the mixture or compound. In addition, vol % is defined as percentage of volume of a particular component of a mixture relative to the total volume of the mixture.

The present disclosure includes several descriptions of exemplary "inks" used in an additive manufacturing process to form the inventive concepts described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extrusion freeform fabrication, or other equivalent techniques and therefore exhibit unique structural and compositional characteristics conveyed via the precise control allowed by such techniques.

In accordance with one general aspect of the presently disclosed inventive concepts, a product includes a porous three-dimensional (3D) printed polymer structure having elastomeric shape memory, where the structure includes a material comprising a plurality of gas-filled microballoons. The 3D printed polymer structure has hierarchical porosity.

In accordance with another general aspect of the presently disclosed inventive concepts, an ink for additive manufacturing includes a matrix material, a filler, and a plurality of gas-filled microballoons.

In accordance with yet another general aspect of the presently disclosed inventive concepts, a method includes extruding a mixture comprising a matrix material, a filler, and a plurality of gas-filled microballoons through a nozzle for forming a structure having hierarchical porosity, and curing the mixture in the formed structure to at least a predefined extent.

The inventive concepts described herein provide an improvement to stochastic elastomeric structures with property-specific tailoring of three-dimensional printed polymer structures having hierarchical porosity and shape memory.

A list of acronyms used in the description is provided below.

3D Three dimensional
ASTM American Society for Testing and Materials
DIW Direct ink writing
C Celsius
cm centimeter
FCT Face-centered tetragonal
FDM Fused deposition modeling
g grams
mg mg
ml milliliters
mm millimeter
$T_g$ Glass transition temperature
μm micron, micrometer
SMP Shape memory polymer Hierarchical porosity, e.g. structural porosity and intrastrand porosity, allows lightweighting and tailoring mechanical response and introduces functionality into 3D printed silicones. Various inventive concepts described herein achieve hierarchical porosity by combining printed structural porosity with intrastrand porosity by adding hollow, gas-filled microballoons to the ink used in the 3D printing.

Unlike conventional shape memory polymers (SMP), inventive concepts described herein form porous elastomeric structures with shape memory behavior. Conventional SMP are programmed about an optimal glass transition temperature ($T_g$) such that the SMP is heated above the $T_g$, programmed (e.g., folded, compressed, manipulated), then cooled to final shape.

As generally understood by one skilled in the art, the glass transition temperature of a material is a temperature, or range of temperatures, at which an amorphous material transitions from a hard, relatively brittle glassy state into a viscous or rubbery state as the temperature is increased. In some approaches, the glass transition temperature may be associated with amorphous regions within semi-crystalline material and as the temperature increases, these amorphous regions transition from a hard glassy state to a viscous material. Moreover, the glass transition temperature of a material tends to be lower than the melting temperature of the crystalline state of the material.

Crystallinity may be used as a fixing state in SMPs resulting in the materials of the SMPs being rigid. Moreover, in some cases, the final form of the SMP is a glassy state, e.g. a rigid, brittle glass. The mechanical properties of SMPs in a rigid, crystalline state or a glassy state are limited. It would be desirable to impart a shape memory change such that the materials are elastomeric while in the secondary shape.

Various inventive concepts described herein introduce $T_g$-specific polymer microballoons in which the component imparting the shape memory, e.g. the shell of the microballoon, may be a minority component of the composite but may affect the material properties of the composite structure in a significant and desired way. The different temperature specifications of the elastomeric matrix and the $T_g$-specific microballoons thereby may allow, at targeted temperatures, shape memory characteristics in an elastomeric material.

In various inventive concepts, elastomers may be embedded with gas-filled, polymer shell microballoons with low glass $T_g$ to form composites with shape memory behavior. When compressed, folded, or otherwise manipulated during thermal soak at temperatures near or above the $T_g$ of the microballoon, the composite may undergo deformation and experience compression set. Full shape recovery of the deformed composite may be achieved by re-heating the composite without mechanical loading or constraint above the $T_g$ of the microballoon for a set time required for the microballoons to expand (due to gas expansion upon heating). Full shape recovery can be achieved in this way.

Various inventive concepts described herein show that aside from their role in tuning the mechanical behavior of 3D printed architectures, $T_g$-specific polymer microballoons may be good candidates for shape memory applications in porous materials requiring structural complexity with the ability to achieve open and/or closed cell porosity.

Various inventive concepts described herein demonstrate that shape memory may be achieved in 3D printed porous elastomers simply by the addition of polymer microballoons with particularly selected shell glass transition temperatures.

Figure 1A:
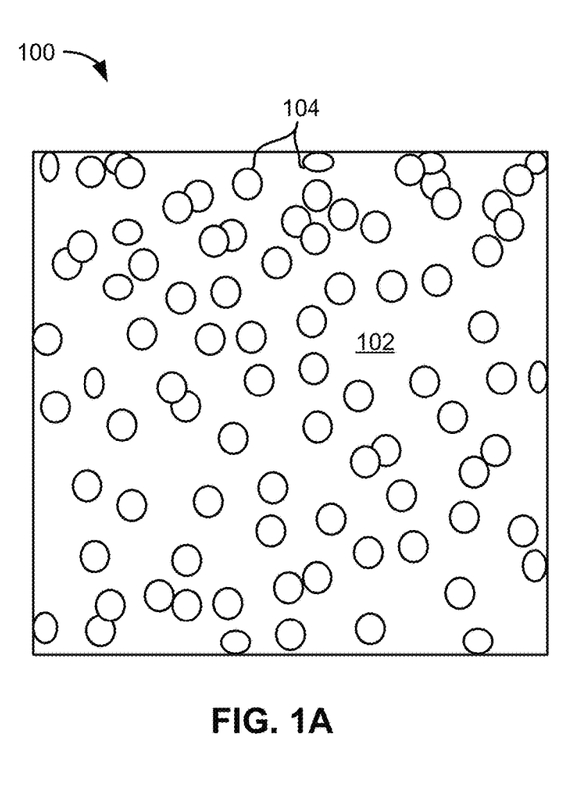
FIG. 1A is a schematic drawing of a cast matrix material filled with $T_g$-specific polymer microballoons, according to one embodiment.
Figure 1B:
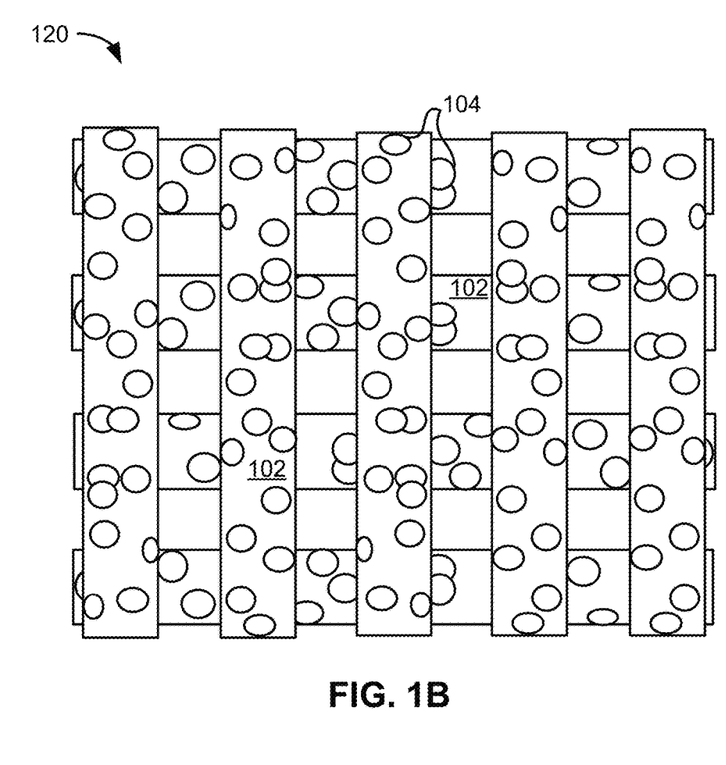
FIG. 1B is a schematic drawing of a three dimensional (3D) printed structure using ink of a matrix material filled with $T_g$-specific polymer microballoons, according to one embodiment.

FIGS. 1A-1B depict products 100 and 120 of elastomeric matrix with polymer microballoons, in accordance with various embodiments. As an option, the present products 100 and 120 may be implemented in conjunction with features from any other embodiment listed herein, such as those described with reference to the other FIGS. Of course, however, products 100 and 120 and others presented herein may be used in various applications and/or in permutations which may or may not be specifically described in the illustrative embodiments listed herein. Further, the products 100 and 120 presented herein may be used in any desired environment.

In one inventive concept, a product may include a porous three-dimensional (3D) printed polymer structure having elastomeric shape memory. The structure may include a material having a plurality of gas-filled microballoons. In some approaches, the plurality of gas-filled microballoons may be a plurality of gas-filled polymer microballoons. Moreover, in some approaches, the structure may have hierarchical porosity. A structure having hierarchical porosity is defined as a structure having porosity across multiple lengthscales.

FIG. 1A is a schematic drawing of a product 100 of an elastomeric matrix material 102 that contains $T_g$-specific polymer microballoons 104. In one approach, as shown in FIG. 1A, a product 100 of elastomeric matrix material 102 with polymer microballoons may be cast (e.g. molded, formed, etc) into a bulk structure (e.g. monolith, mold, etc).

In another approach, as shown in FIG. 1B, a product 120 of elastomeric matrix material 102 with polymer microballoons 104 may be printed into a 3D structure by various techniques.

In one approach, a closed cell composite, e.g., shown as a product 100, may have mechanical properties that are defined by the matrix material 102, which is the majority component of the composite, with porosity provided by flexible, thin-walled $T_g$-specific polymer microballoons 104 mixed within the matrix material 102. The matrix material 102 may be an elastomeric material that provides dampening and cushioning but typically may not provide shape memory.

In various inventive concepts, the thin-walled $T_g$-specific polymer microballoons 104 may provide a shape retention component of the structure, for example, a structure printed with an elastomer matrix filled with thin-walled $T_g$-specific polymer microballoons allow imposition of shape memory behavior to an elastomer matrix.

In another approach, an open cell composite structure formed by 3D printing (as shown in product 120, FIG. 1B) may have elastomeric matrix material 102 that provides structural porosity, and the flexible, thin-walled $T_g$-specific polymer microballoons 104 provide intrastrand porosity as well as shape change memory. In other approaches, an open cell composite structure may be formed as a mold or cast by foam-forming processes in which open pores are imparted in the matrix material. As described with the closed cell composite above, the matrix material 102 may be an elastomeric material that provides dampening and cushioning but typically may not, by itself, provide shape memory. In various inventive concepts, the thin-walled $T_g$-specific polymer microballoons may provide a shape retention component of the structure, for example, a structure printed with an elastomer matrix filled with thin-walled $T_g$-specific polymer microballoons allow application of shape memory to an elastomer matrix.

In one approach, the matrix material 102 may be an energy dissipating material. In another approach, the matrix material 102 may also and/or alternatively be an elastomer material. Illustrative matrix materials 102 include rubbery polymers, siloxane, polysiloxane, polyolefins (e.g. ethylene-propylene, isobutylene, isoprene, chloroprene . . . rubbers), polyurethanes, fluorinated olefins, polyethers, and their copolymers; acrylics (poly-n-butyl acrylate, poly-ethyl acrylate, their copolymers), etc. In an exemplary approach, the matrix material 102 is a siloxane resin.

Figure 1C:
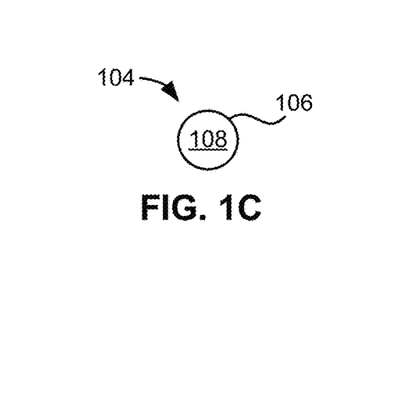
FIG. 1C is a schematic drawing of the cross-section of a $T_g$-specific polymer microballoon, according to one embodiment.

FIG. 1C shows a schematic drawing of the cross-sectional view of a $T_g$-specific polymer microballoon 104, according to one approach. The polymer microballoon may be referred to as microsphere, microbead, etc., as the shape of the microballoon may be spherical, but other shapes are also contemplated. In some approaches, the polymer microballoon may be an expandable microscopic sphere. In one approach, the polymer microballoon has a thermoplastic shell 106 that encapsulates a filling 108 that may include a gas with a low boiling point, e.g. isobutane. In various approaches, the shell 106 of the microballoon may be formed from copolymer material.

Flexible, polymer microballoons with a desired $T_g$ may be obtained commercially or synthesized using methods known by those skilled in the art, e.g. emulsification techniques, micro-fluidic techniques, etc. In exemplary approaches, flexible, $T_g$-specific polymer microballoons mixed in with an elastomeric matrix allow shape change when heated above the $T_g$ of the microballoons and retain the shape change at cooler temperatures. Without wishing to be bound by any theory, it is believed that the $T_g$-specific polymer microballoons are capable of counteracting the elastic force of the elastomeric matrix when certain conditions are met, such as application of heat to the microballoons, thereby resulting in a shape change memory of the typically elastomeric, porous matrix structure.

Polymer microballoons having any possible $T_g$ may be used in various embodiments. The particular $T_g$ may be selected based on the desired application.

In some approaches, the shell 106 may be a structured copolymer material that contributes to a $T_g$ of the polymer microballoon where the $T_g$ of the polymer microballoon is between a lower temperature that allows deformation of the structure containing the polymer microballoons and a higher temperature that allows recovery of the original shape of the structure containing the polymer microballoons. In an exemplary approach, the $T_g$ of the polymer microballoon may be between about 40° C. and about 60° C. In one specific example, the $T_g$ of the polymer microballoon may be preferably about 44° C., referred to herein as $T_g44$.

The co-polymer microballoons may have any desired diameter. In some approaches, the size of the co-polymer microballoons may have a diameter in a range of about 20 µm to about 100 µm, preferably 30 µm to about 50 µm. In some approaches, an upper limit may be determined by the structural dimensions of the polymer composite. In exemplary approaches, microballoons may be 5:1 or preferably, 10:1 the smallest length of the part for continuum-like behavior. Upper limits may be limited by localized effects that may dominate in the polymer composite with larger microballoons.

In some approaches, the volume % (vol %) concentration of microballoons in the matrix material may be in the range of from about 5 vol % to a maximum packing of the microballoons in the matrix material, where the maximum vol % of microballoons may vary depending on the type of matrix material and the type and size of microballoons. In an exemplary approach to enable shape change memory, the vol % of microballoons may be in the range of about 20 vol % to about 50 vol % of microballoons in the matrix material.

Various inventive concepts described herein, the porous 3D printed polymer structure may have at least 97% shape memory behavior compared to an original shape of the structure. The shape memory behavior may be defined as follows: compression of the structure, followed by heating near or above $T_g$, results in up to about 60% reduction in original thickness of the structure after cooling and removal of physical constraints; subsequent heating of this compressed structure above $T_g$ results in at least 97% recovery of original thickness.

In some approaches, the porous 3D printed polymer structure following recovery from compression may have at least 97% structure porosity compared to the porosity of the structure before compression.

Figure 2:
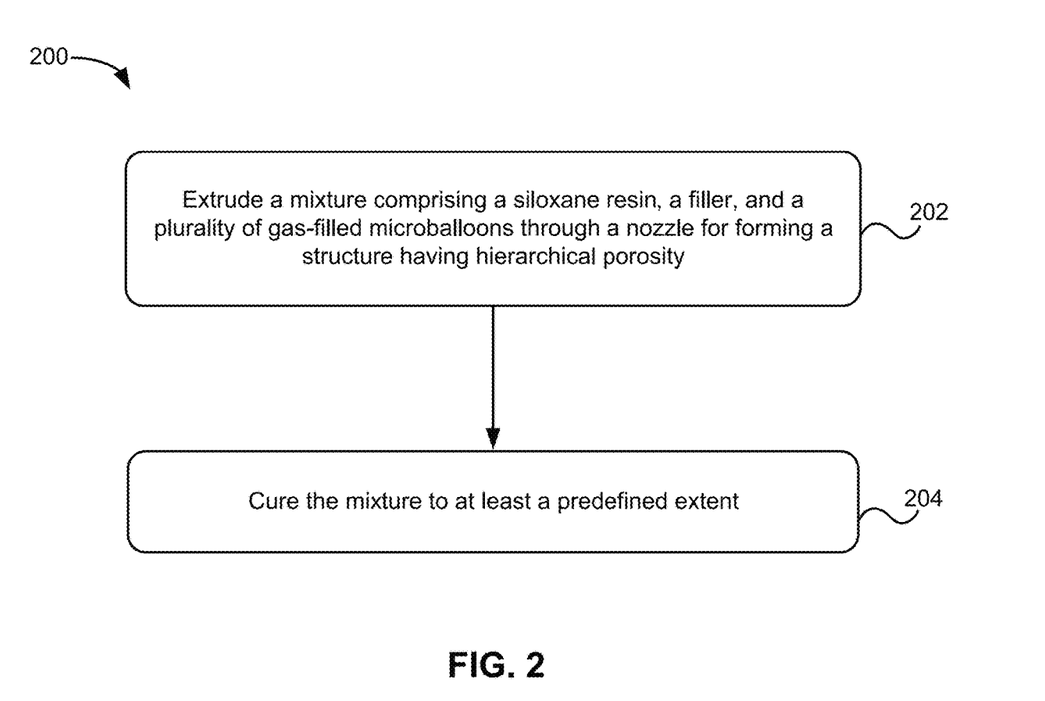
FIG. 2 is a flowchart of a method, according to inventive concepts described herein.

FIG. 2 shows a method 200 for forming a porous three-dimensional printed polymer structure having elastomeric shape memory in accordance with one embodiment. As an option, the present method 200 may be implemented to form structures such as those shown in the other FIGS. described herein. Of course, however, this method 200 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 2 may be included in method 200, according to various embodiments. It should also be noted that any of the aforementioned features may be used in any of the embodiments described in accordance with the various methods.

In one approach, method 200 begins with operation 202 of extruding a mixture that includes a matrix material, a filler, and a plurality of gas-filled microballoons through a nozzle for forming a structure having hierarchical porosity. In some approaches, the mixture may be an ink for additive manufacturing. In some approaches, the mixture may be an ink for three-dimensional (3D) printing. In some approaches, the mixture may be an ink for direct ink writing. In preferred approaches, the mixture may be a siloxane-based ink for direct ink writing.

In some approaches, the concentration of the plurality of gas-filled microballoons may be in a range of about 20 volume % to about 60 volume % of total volume of ink. In some approaches, the plurality of gas-filled microballoons may include isobutane.

In some approaches, the filler of the microballoons may have a glass or crystalline transition in the temperature range of about room temperature (e.g. between about 20° C. and 25° C.) to about 200° C. In some approaches, the plurality of gas-filled microballoons may include a shell having copolymer material. In other approaches, the plurality of gas-filled microballoons may include a shell having polymer material. Illustrative examples of shell material include polymethylmethacrylate, polystryrene, polystyrenedivinylbenzene copolymer, polycarbonate, polyacetal, polyethyleneterephthalate, polyethylenenaphthalate, etc. In one approach, the plurality of gas-filled microballoons may include a shell having phenol formaldehyde resin. In preferred approaches, the shell of the gas filled microballoons may include poly(vinylidene chloride-co-acrylonitrile-co-methyl methacrylate (e.g. as included in Expancel).

In some approaches, the gas-filled microballoons may have a glass transition temperature in a range of about room temperature (e.g. between about 20° C. and 25° C.) to about 200° C. The transition temperature in the microballoon shell allows the material comprised of the microballoons to take on a temporary shape at temperatures below the transition temperature. Then, at temperatures above the transition temperature, the material comprised of the microballoons may recover to a primary or equilibrium shape. The transition may be a glass transition, a crystalline transition, etc.

In some approaches, the gas-filled microballoons may have a glass transition temperature of less than 60° C. In preferred approaches, the gas-filled microballoons may have a glass transition temperature less than 50° C. In an exemplary approach, the gas-filled balloons have a glass transition temperature of 44° C.

In some approaches, the gas-filled microballoons may have a glass transition temperature less than 115° C. In one approach, the gas-filled balloons have a glass transition temperature of 113° C.

In various approaches, the matrix material 102 may be an energy dissipating material. In another approach, the matrix material 102 may also and/or alternatively be elastomer material. Illustrative matrix materials 102 include rubbery polymers, siloxane, polysiloxane, polyolefins (e.g. ethylene-propylene, isobutylene, isoprene, chloroprene . . . rubbers), polyurethanes, fluorinated olefins, polyethers, and their copolymers; acrylics (poly-n-butyl acrylate, poly-ethyl acrylate, their copolymers), etc. In an exemplary approach, the matrix material may be a siloxane resin, preferably, a polydimethylsiloxane resin.

In some approaches, the filler in the mixture may be a nanosilica filler.

In some approaches, the mixture of the ink may include a curing agent. For example, the curing agent may be a heat-cure additive that induces polymerization of the mixture of the structure during application of heat. In other approaches, the curing agent may be an additive that may be activated by ultraviolet radiation.

In some approaches, the mixture (e.g. ink) may contain an effective amount of one or more additional additives that may perform specific functions. For example, but not limited to, the additives may enhance dispersion, phase stability, and/or network strength; control and/or change pH; modify rheology; reduce crack formation during drying; enhance curing; etc. The effective amount of an additive is an amount that imparts the desired function or result, and may be readily determined without undue experimentation following the teachings herein and varying the concentration of the additive, as would become apparent to one skilled in the art upon reading the present description.

A 3D printing approach to form the elastomeric composite with $T_g$-specific polymer microballoons enables property-specific tailoring, resulting in mechanical metamaterials that may be tuned with constituent material behavior, porosity and structure. Examples of 3D printed metamaterials may be found in ceramic and metallic hierarchical lattice structures with mechanical behavior outside that of conventionally processed materials achieved through tuning levels of hierarchy, porosity and material constituents.

In a 3D printing process, viscoelastic inks with highly controlled rheological behavior may be extruded through a microscale nozzle or die, thereby resulting in the layer-by-layer building of programmable architectures whose complexity may be controlled by strand size and spanning distance over gaps in the underlying layers. Strand size may be influenced by the applied pressure, die geometry, and rheological response of the resin. Spanning distance over gaps in the underlying layers may be a function of gel strength, deposition speed, shear rate, and resin density. Various embodiments described herein form intrastrand porosity using an elastomeric based ink comprised of $T_g$-specific polymer microballoons to further enhance the compressibility of porous elastomeric structures.

In various approaches, 3D structures may be formed by additive manufacturing techniques, for example, but not limited to, stereolithography-based methods, powder bed binder printing, selective laser sintering, ink-jet printing, direct ink writing, etc.

Figure 4A:
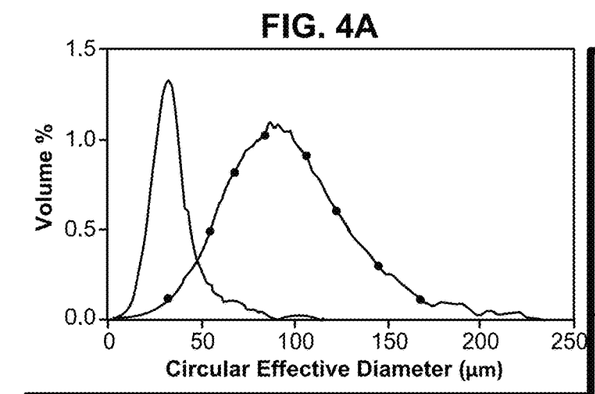
FIG. 4A is a plot of particle size distribution using transmitted light microscopy of $T_g44$ and $T_g113$ microballoons.
Figure 4B:
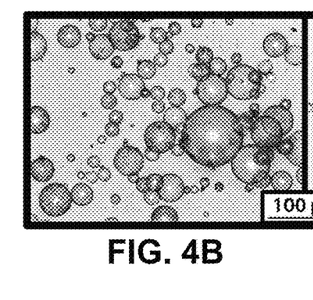
FIG. 4B is an optical microscopy image of $T_g44$ microballoons.
Figure 4C:
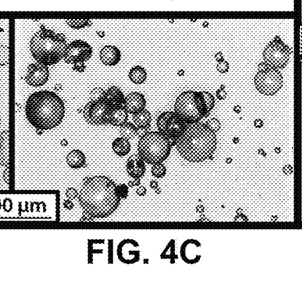
FIG. 4C is an optical microscopy image of $T_g113$ microballoons.
Figure 4D:
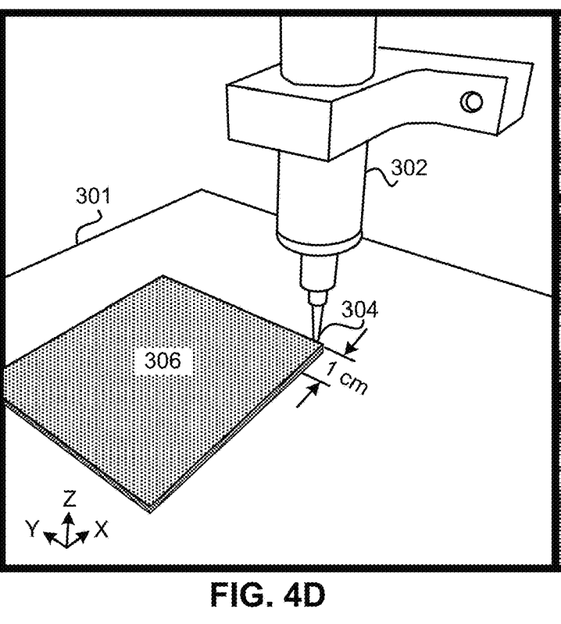
FIG. 4D is a schematic illustration of the 3D printing process, according to one approach.

One 3D printing process, using a direct ink writing (DIW) process, illustrated in FIG. 4D, highlights the potential of $T_g$-specific polymer microballoons to substantially reduce the printed strand density, which may lead to enhanced strand spanning capability. In various approaches, DIW using ink comprised of elastomeric matrix with $T_g$-specific gas-filled polymer microballoons may form structures in any conceivable formation, such as cross-pike formation, log-pile formation in which each stack is orthogonal to the stack underneath (see FIG. 1B), a stacked formation in which each layer is at an angle (e.g. 45°, 60°, 90°, etc.) from the layer below, rotating stacks forming a helical-type structure, spiral formation, etc. Moreover, the microarchitecture of structures formed by 3D printing may introduce porosity in a specific mode, e.g., open cell porosity, closed cell porosity, volume filling, etc. In some approaches, the macrostructure formed by 3D printing with the ink including elastomeric matrix with $T_g$-specific gas-filled microballoons may have hierarchical porosity.

In one approach of solid-based additive manufacturing (e.g. fused deposition modeling (FDM)), a shape of a 3D volume may include stacking filaments as directed by a computer. Following this method, elastomers may be printed in 3D at a temperature range below the operation of the $T_g$-specific gas-filled microballoons. For example, for 3D printing by FDM, a thermoplastic elastomeric material with a melting temperature range that is below the temperature range of the $T_g$-specific polymer microballoons may successfully preserve microballoon structure during printing.

$T_g$-specific polymer microballoons may provide a means of tuning the mechanical performance of 3D printed elastomers, beyond architecture; the lattice is limited by nozzle diameter, ink rheology and available extrusion pressure.

In one approach of method 200, as shown in FIG. 2, after forming the structure, operation 204 includes curing the mixture formed into the structure to at least a predefined extent, which may include partial curing or full curing. Preferably, the material in the structure is cured enough to enable the structure to retain its freestanding physical form factor upon completion of the curing cycle. In some approaches, curing includes a purge with inert gas at a first temperature and heating at a second temperature, and the first and second temperatures may be different. In some approaches, the predefined extent of curing is the extent that the structure has the desired form, and stability according to a predefined specification. The predefined extent may be readily determined without undue experimentation following the teachings herein and varying the concentration of the curing agent and/or conditions of curing (e.g. heat, ultraviolet radiation, etc.), as would be apparent to one skilled in the art upon reading the present description.

3D printed elastomeric structures filled with $T_g$-specific polymer microballoons may demonstrate shape memory behavior. The shell thickness of the microballoons and $T_g$ of the microballoons may affect compressive behavior and compression set of 3D printed structures formed with matrix material filled with $T_g$-specific polymer microballoons. In some approaches, a matrix filled with $T_g$-specific polymer microballoons may introduce another level of porosity in 3D-printed strands of the structures and thereby alter the mechanical response that may be dependent on the shell thickness and mechanical behavior of the $T_g$-specific polymer microballoons.

In one approach, a 3D structure formed with matrix infused with $T_g44$ microballoons may undergo compression set at short holds at temperatures above $T_g$ (e.g. 70° C. to 110° C.). While substantial shape recovery of the compressed structure may be observed at lower temperature reheats, complete structural recovery may occur upon reheating at elevated temperature (110° C.). Without wishing to be bound by any theory, the shape recovery may be attributed to re-expansion of the microballoons when heated above $T_g$ and with shape retention accommodated by the cross-linked structure.

In other approaches, a reduced compression set may be observed in a higher $T_g$ system (e.g. $T_g113$ microballoons) with a lack of recovery of shape upon reheating. In some approaches, the structural response may be tuned using a hierarchical combination of open and closed cell porosity, in conjunction with the addition of variable $T_g$-specific polymer microballoon populations.

The shape memory behavior exhibited by the $T_g44$ microballoon-filled 3D printed structures may demonstrate a potential use in wearable protective padding and cushions with $T_g$ optimized for human body temperature (e.g., 95-101° F.), in shape memory polymer matrices toward the development of tandem shape memory polymers capable of recovery in stages depending on the temperature.

In one approach, flexible, co-polymer microballoons may be used in conjunction with conventional foam manufacturing techniques, for example, gas-blown polymer foam techniques (e.g. using blowing agents), continuous direct foam forming techniques (e.g. using a poreformer), etc. The flexible, low $T_g$-specific polymer microballoon material may impart a shape memory effect in the foam formation.

In some approaches, foams may be formed with two or more different types of porosities. In one approach, pores may be introduced using the low $T_g$-specific polymer microballoons. In another approach, or the same approach, pores may be introduced by the foam formation, e.g., by gas-blown techniques, of expanding the matrix material and creating pores. In one gas-blown foam formation approach, porosity may be closed cell in which discrete cells (e.g. microballoons) are dispersed in the matrix. In another gas-blown foam formation approach, porosity may be open cell in which pathways are formed through the matrix structure such that the pathways percolate, e.g., as to allow gas to flow in and out of the foam structure.

In some approaches, foams formed with elastomeric matrix material and low $T_g$-specific polymer microballoons may have tunable mechanical behavior in terms of tension, compression, expansion coefficient, etc.

In some approaches, a 3D printed structure may be tuned with different variable $T_g$-specific polymer microballoon populations in the elastomeric matrix. In some approaches, during the printing process, the structure may have different compositions of a microballoon. In one approach, microballoons of the same type may be discrete and esoterically placed in a 3-dimensional volume. In another approach, the microballoons may be placed to amplify the shape memory effect and randomly distributed throughout the volume. In yet another approach, a single layer of a 3D printed structure may have a microballoon of one type in a concentration gradient across the layer.

In some approaches, printing may be performed using a displacement controlled 3-axis 3D printing platform, resulting in cross-ply structures 306 with each subsequent layer fashioned at a 90° angle from the one prior. FIG. 4D is a simple schematic illustration that illustrates a 3-axis 3D printing platform 301 with a 3D printing apparatus 302. The formed structure 306 may be a face-centered tetragonal (FCT) 3D structure. As shown in FIG. 4D, a 250 μm nozzle 304 may be used to produce prints, for example but not meant to be limiting in any way, prints may be produced at a size of a 50×50 mm square at 8 layers thick, as indicated by the scale bar of 1 cm in FIG. 4D.

In some approaches, the structure having a FCT structure may be compressed to structural lock up in which the struts of the of the structure in contact with neighboring struts dominate the compression of the structure. In some approaches, the compression state of the structure may be due to the material of the structure. In one approach, the structural based response to compression may become a material based response to compression. For example, a porous material under compression may become a material without porosity.

Figure 4E:
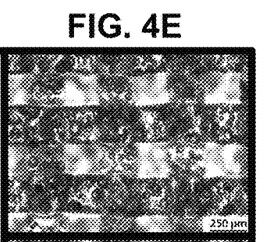
FIG. 4E is an optical microscopy image of x-y view of the 3D printed filaments, according to one approach.
Figures 4F, 4G:
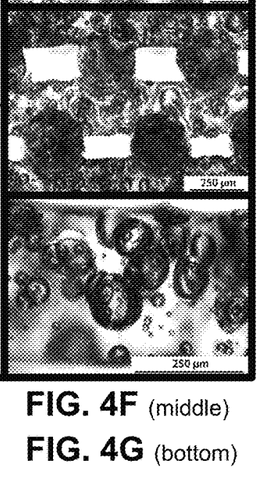
FIG. 4F is an optical microscopy image of x-z view of the 3D printed filaments, according to one approach.
FIG. 4G is a high magnification optical microscopy image of the x-z view (FIG. 4F) of a 3D printed filament, according to one approach.

FIGS. 4E-4G are optical images of printed silicones with microballoons showing the x-y view (FIG. 4E), the x-z view (FIG. 4F), and a high magnification of the image shown in FIG. 4F showing microballoons in a printed filament (FIG. 4G).

In some approaches, a 3D printed structure may be tuned to have compositions of different types of microballoon populations in the elastomeric matrix. In one approach, microballoons of different types may be discrete and esoterically placed in a 3-dimensional volume. In another approach, the microballoons of different types may be placed to amplify the shape memory effect and randomly distributed throughout the volume. In yet another approach, 3D printing of the structure may involve targeted placement of microballoons of different types.

In some approaches, a 3D-printed structure may be tuned to have different microballoons in different layers of the structure. In one approach, for example, a single layer may contain microballoons of one type, the next layer contain microballoons of a different type, and the following layer contain microballoons of yet another type of microballoons or the same type as the first and/or second layer.

In some approaches, gradients of microballoon types and/or concentrations may be formed within a 3D structure, e.g., by selectively controlling the composition of the ink during printing. In one approach, a single layer may have microballoons of two different types in a concentration gradient. In another approach, each layer may have a defined concentration gradient of a microballoon of one type where the gradient may be different within each layer. In yet another approach, a gradient of the microballoons in each layer may result in an expansion effect in the 3D printed structure.

Experimental Methods
Materials

Figure 3A:
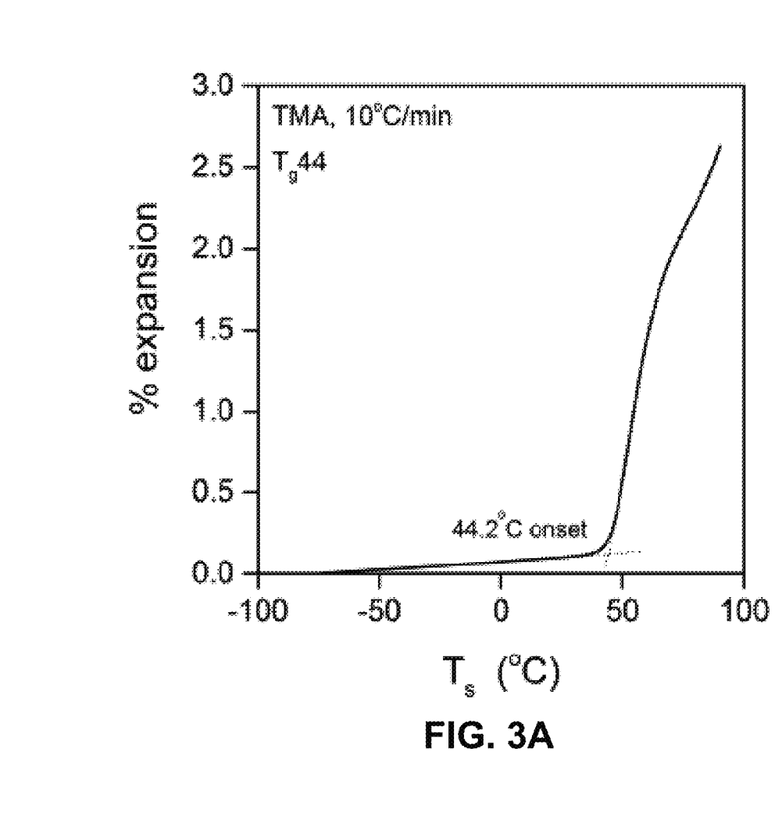
FIG. 3A is a plot of thermodynamic behavior of $T_g44$ microballoons assessed by thermomechanical analysis.

Polydimethylsiloxane resin (Dow Corning® SE 1700, Midland, MI) with nanosilica filler for yield stress behavior and fracture toughness was used as the matrix phase in this study. The effect of microballoon shell material behavior on DIW structure compressibility was studied using two commercially available materials. $T_g44$ microballoons are characterized as isobutane filled, thermally expanded poly(acrylonitrile-co-vinylidene chloride-co-methyl methacrylate) microspheres (AzkoNobel Expancel® 551 DE 40 d42, Duluth, GA 30096) with a gas displacement density of 0.042 g/cc and with a glass transition temperature, $T_g$, of 44° C., measured using thermomechanical analysis (FIG. 3A) rather than dynamic scanning calorimetry due to their extremely light weight. The $T_g44$ microballoons are depicted in the optical microscope image in FIG. 4B.

Figure 3B:
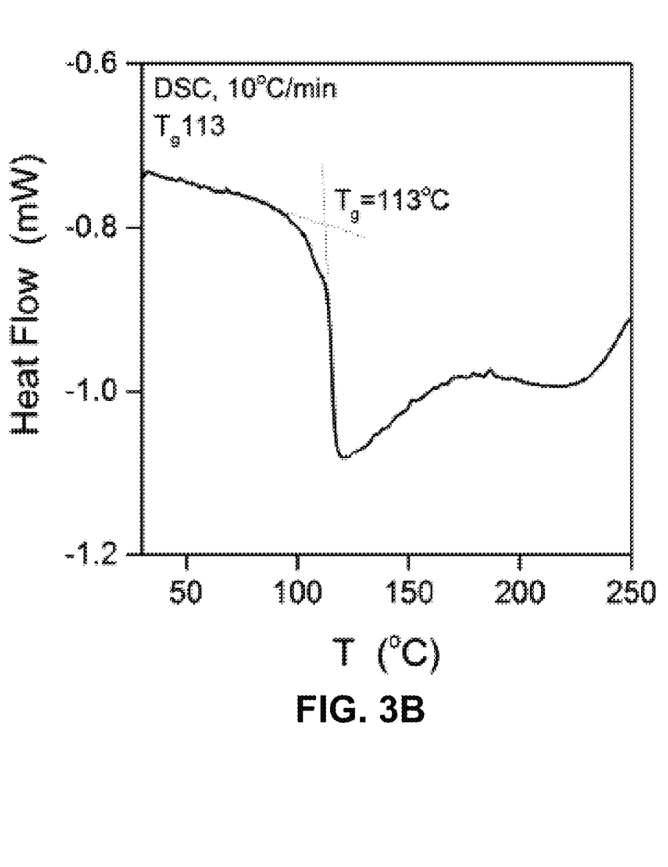
FIG. 3B is a plot of thermodynamic behavior of $T_g113$ microballoons assessed by dynamic scanning calorimetry.

$T_g113$ microballoons are characterized as formaldehyde resin shell microspheres (Asia Pacific Microspheres BJO-0930, Selangor Darul Ehsan, Malaysia) with a liquid displacement density of 0.21-0.25 g/cc. These phenolic microballoons possess a $T_g$ of 113° C., as measured using dynamic scanning calorimetry (FIG. 3B). The $T_g113$ microballoons are depicted in the optical microscope image in FIG. 4C.

Particle cross-sectional areas were measured using automated transmitted light microscopy (Malvern Morphologi G3, Westborough, MA 01581) and the particle size distribution was calculated assuming the particles are spherical.

DIW Ink Preparation

A volumetric loading of 40% microballoons in the silica filled siloxane resin was used as a standard to compare the two microballoon materials. This selection was made on the basis that 40 vol % filler content would not result in significant jamming and thickening behavior given the broad size distributions, yet may have a significant impact on the overall mechanical performance of printed structures.

Resin was prepared by blending 40 vol % microballoons into the siloxane base resin (SE 1700 Part A base, Dow Corning, Auburn, MI 48611) using a vacuum gravitational mixer (Thinky ARV 310, Laguna Hills, CA 92653) at 2000 rpm for 1 min. After this time, the microballoon resin mixture was hand mixed, followed by another round of noncontact mixing under vacuum at 2000 rpm for 1 min. While no noticeable heating occurred during blending, the material was allowed to cool in a standing water bath for 5 min, prior to non-contact mixing of SE1700 Part B curing agent at 2000 rpm for 20 s. The microballoon suspension was transferred to a 30 cc syringe for printing.

Ink Rheology

Figure 5A:
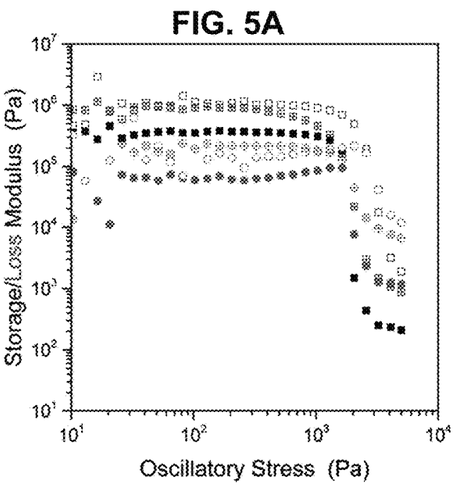
FIG. 5A is a plot of rotational oscillatory response on storage and loss moduli of structures formed with matrix, matrix+$T_g44$ microballoons, and matrix+$T_g113$ microballoons.
Figure 5B:
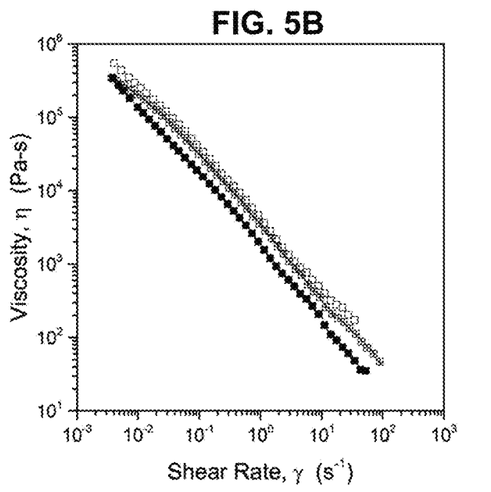
FIG. 5B is a plot of continuous flow behavior of ink containing matrix, matrix+$T_g44$ microballoons, and matrix+$T_g113$ microballoons.

The effect of microballoon addition on the rheological behavior of siloxane resin was evaluated using rotational rheology (TA Instruments AR 2000ex (New Castle, DE 19720) equipped with cross-hatched parallel plates to prevent microballoon compression and mitigate wall slip effects). Oscillatory experiments (FIG. 5A) were performed at 10 Hz and power law behavior was observed under continuous flow (FIG. 5B).

DIW Printing

Printing was performed using a displacement controlled 3-axis 3D printing platform, resulting in cross-ply structures 306 with each subsequent layer fashioned at a 90° angle from the one prior, as described above in FIG. 4D. Structures having face-centered tetragonal (FCT) were produced. A 250 μm nozzle was used to produce prints of 50×50 mm squares at 8 layers thick. Printed structures were oven cured under a nitrogen purge for 6 h at 60° C., followed by 1 h at 150° C. and a post cure at 125° C. for 12 h. These structures possessed overall densities of 0.50 g/cc and 0.42 g/cc using 40 vol % of the $T_g113$ and $T_g44$ microballoons, respectively.

Thermal and Mechanical Characterization

Mechanical response was evaluated under compressive loading supplied by an Instron 5944 universal testing frame equipped with a 2 kN load cell. Strain was measured using a 0.5" strain gage extensometer on 2.2 cm (⅞ in) diameter, 1.6 mm thick printed FCT specimens. Compression set was assessed on printed FCT structures punched to 13 mm diameter and 1.6 mm thick (8 layers). Following the active standard test method for rubber property (ASTM D395), printed structures were compressed to 40% and 60% strain and soaked at 70° C. for 70 h, cooled under compression, released and allowed to relax for 10 min, prior to measurement. To evaluate recovery, specimens were reheated at temperatures equal to or greater than that of the compressed soak for a series of times until no further structural changes were observed.

Figure 7:
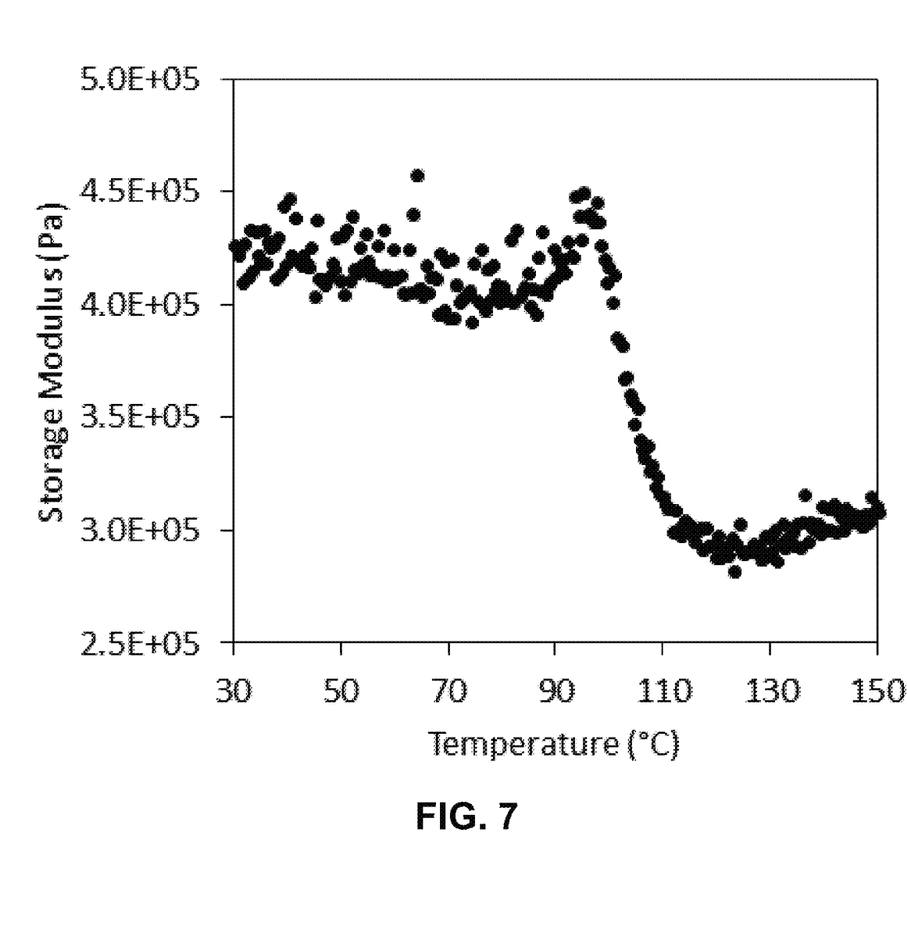
FIG. 7 is a plot of storage modulus as a function of temperature of a cast structure formed with matrix+$T_g$44 microballoons (40 vol % $T_g$44), according to one approach.

Dynamic mechanical thermal analysis (oscillatory compression) was performed to illustrate the shape memory actuation transition of a cast structure with 40 vol % $T_g44$ microballoons in the matrix (FIG. 7).

Experimental Results

3D Printed Materials

FIGS. 4A-4C illustrate the two different gas filled microballoon pore former particle size distributions used to evaluate the effect of shell stiffness and glass transition temperature, on compressive behavior and shape memory in 3D printed structures. The circular effective diameter values are shown in FIG. 4A ($T_g44$, solid line; $T_g113$, solid line with closed circles). Optical microscopy images of microballoons are shown in FIG. 4B ($T_g44$ microballoons) and FIG. 4C ($T_g113$ microballoons) Despite the difference in particle size distribution between the two microballoon lots, shell thickness for each was measured to be 1-2 μm using scanning electron microscopy and optical microscopy of fractured particles. Note that there are a significant fraction of doublets and triplets in the $T_g113$ system (FIG. 4C), as opposed to the $T_g44$ system (FIG. 4B).

FIGS. 4E-4G are optical images of printed silicones with microballoons showing the x-y view (FIG. 4E), the x-z view (FIG. 4F), and a high magnification of the image shown in FIG. 4F showing microballoons in a printed filament (FIG. 4G).

Rheological Behavior

To achieve optimal elastomeric flow behavior for the composite inks, stress controlled rotational rheology experiments were performed using a variety of conditions with a typical microballoon loading of 40 vol %. The effect of microballoons on rotational oscillatory response is shown in FIG. 5A. Under oscillatory flow at a frequency of 10 Hz, the effect of 40 vol % microballoon addition ($T_g44$ as open squares, $T_g113$ as squares with cross) manifested as an increase in storage modulus as compared to resin without microballoons (closed squares). Under similar conditions, the effect of microballoon addition ($T_g44$ as open circles, $T_g113$ as circles with cross) manifested as an increase in loss modulus as compared to resin without microballoons (closed circles).

The effect of microballoons on continuous flow behavior of the ink is shown in FIG. 5B. As shown, there was a slight increase in yield stress in the case of the $T_g44$ resin, while maintaining printability. No permanent die swell was observed through either measurement of printed strands or in situ measurement of flow near the die exit (FIG. 5B, without microballoons, solid squares; 40 vol % $T_g44$, open squares; 40 vol % $T_g113$, square with cross). This may have been attributable to power law behavior due to wall slip/plug flow, indicating that no configurational entropy was recovered upon nozzle exit.

Subtle influences of the pore former size distribution and volume loading on rheological behavior were observed. However, printability and structural repeatability was minimally affected.

Mechanical Response

Figure 5C:
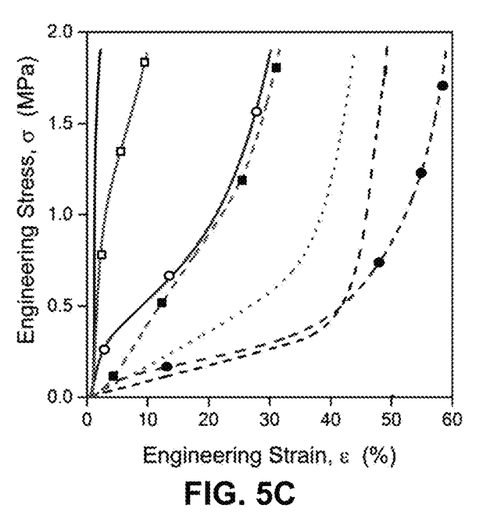
FIG. 5C is a plot of response to compressive loading of cast and 3D printed structures, according to various approaches.

The effect of microballoons on the response to compressive loading of cast and 3D printed structures is shown in FIG. 5C. To isolate the effect of structural porosity from intrastrand porosity, both bulk and printed structures were evaluated. Applied deformation (strain measured along x-axis) resulted in a nonlinear stress response (as indicated on y-axis), with a change in slope or elastic modulus at 1000 kPa and 300 kPa. A cast structure of siloxane matrix without polymer microballoons (solid black line) does not demonstrate significant compactness in terms of engineering strain in response to compressive loading. In contrast, a 3D printed structure of siloxane matrix without polymer microballoons (e.g. 3D printed in cross-ply, alternating 0° to 90° layered structures referred to as face-centered tetragonal) (dashed black line) demonstrated two regimes of compression response. In the first regime below 300 kPa in which strain was less than 40% E, deformation of the siloxane matrix was dependent on the structural porosity of the architecture, for example, 3D printed structures are more susceptible to compaction and inlaying of upper layers in layers below. In the second regime, at higher stress, deformation appeared to be dependent on strand material properties.

In some approaches, the transition between the two regimes (structural porosity vs strand material properties) may be referred to as structural lock-up. The first regime dependent on structural porosity may be a deformation mechanism of strand nestling in the FCT-printed structures during compression loading.

In cast structures of siloxane matrix with polymer microballoons, each cast structure was filled with 40 vol % microballoons. There was a compression response in each of the structures and zero deformation was determined based upon a minimum applied or supported load. The cast siloxane matrix with $T_g113$ microballoons (solid line with open squares) demonstrated a slight compression with approximately 9% strain in response to compression.

The inclusion of the $T_g44$ microballoons may minimally affect the first regime of response (structural porosity), yet may substantially lower the material stiffness of the structure in the second regime (above 40% strain). As shown in FIG. 5C, the cast of the siloxane matrix with $T_g44$ microballoons (solid line with open circles) demonstrated a remarkable 27% strain in response to compression to 1.9 MPa; this effect may be attributed to the compressibility of $T_g44$ microballoons. Thus, the cast siloxane matrix with $T_g44$ microballoons showed strand material properties (e.g. reduced material stiffness) independent of structure porosity. Furthermore, the cast siloxane matrix with $T_g44$ microballoons demonstrated compressibility of the $T_g44$ microballoons.

In contrast, the cast siloxane matrix with $T_g113$ microballoons demonstrated that the $T_g113$ microballoons may be considerably stiffer than the $T_g44$ microballoons. Strain in these compacted structures was attributed to yielding of the microballoons. Without wishing to be bound by any theory, it is believed that the lower stiffness observed above 0.5 MPa of the cast siloxane matrix with $T_g113$ microballoons may be attributed to the fracture of the glassy microballoon shell in the matrix.

In the 3D printed structures filled with microballoons, different vol % of microballoons was assessed and demonstrated the effect of microballoon mechanical properties on open cell 3D printed structures. In 3D structures filled with 40 vol % $T_g113$ microballoons (dashed line with solid squares), a stiffer material response was observed compared to 3D printed structures without microballoons (dashed line), thereby suggesting that, at 40 vol %, the glassy, rigid microballoons inhibit structural motion/strand nestling. The effect of the $T_g113$ microballoons was lessened in the 3D printed structure of 25 vol % $T_g113$ microballoons (dotted line) which exhibited greater deformation below 600 kPa. The strain accommodated during the first regime was reduced, e.g. from ~40% to 35% ε in comparison with the strain accommodated by a structure printed using matrix material only (dashed line). For 3D printed structures of 25 vol % (dotted line) and 40 vol % (dashed line with solid squares) $T_g113$ microballoons, the stiffness of the material above the lock-up stress (i.e. the point at which structural porosity becomes very small) in the microballoon-filled printed structures was comparable to that of the 3D printed siloxane structure without microballoons (dashed line).

Conversely, the lower stiffness of the $T_g44$ microballoons did not increase structural resistance to compression. In fact, as shown with the 3D printed structure with 40 vol % $T_g44$ microballoons (dashed line with solid circles), the structure demonstrated lower stiffness response throughout loading beyond structural lock up or interlayer compaction.

Shape Memory Behavior

Figure 6A:
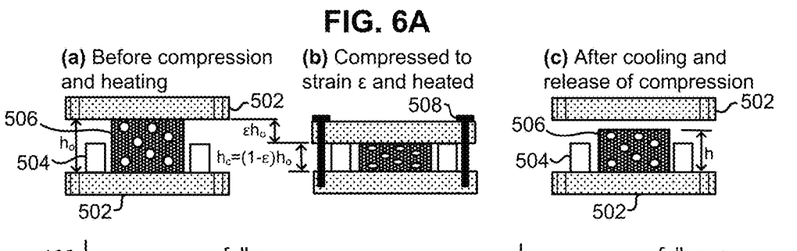
FIG. 6A is a schematic drawing of a shape memory experiment.

FIG. 6A depicts a schematic illustration of the shape memory experiment. In order to assess the long term effect of microballoon addition on structural performance, shape memory evaluations were quantified by compression set. The shape memory experiment included a compression set as illustrated in parts (a), (b), and (c). Part (a) illustrates the before testing or initial state in which the printed structure 506 is placed between two spacers 504 with the movable compression stages 502 above and below the printed structure 506. The height $h_o$ of the printed structure 506 before testing is equal to the distance between the top and bottom of the printed structure 506, and the compression stages 502 contact the top and bottom of the printed structure 506 without compression.

Part (b) of FIG. 6A illustrates applying a compression load to the printed structure 506, where compression stages 502 apply a strain r to the printed structure 506. The compression load at a certain strain r may be maintained by securing the compression stages 502 with bolts 508. In some approaches, the compression load may be applied during a thermal soak, for example, at temperatures of 40° C., 70° C., 110° C. At a certain strain $\varepsilon h_o$, the height $h_c$ of the printed structure 506 under compression may be defined as follows.

$$h_c = (1-\varepsilon)h_o \quad \text{Equation 1}$$

In some approaches, the printed structure may be cooled under compression.

Part (c) of FIG. 6A illustrates the release of the printed structure 506 from the compression load applied in part (b) such that the printed structure 506 is uncompressed. In various approaches, the release from compression load may take place at different temperatures, for example, 70° C., 110° C., etc. The height h of the uncompressed printed structure 506 is the distance from the bottom of the printed structure to the top of the printed structure in the uncompressed state.

Figure 6B:
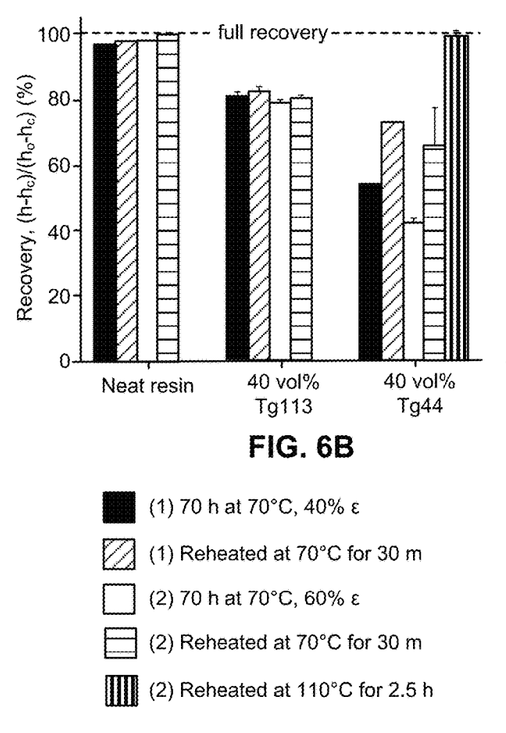

FIG. 6B shows shape memory behavior following a thermal soak under compressive strain at 70° C. for 70 hours. Solid black bars depict recovery after compressive strain at 40% ε, diagonal stripe bars depict recovery of the samples compressed to 40% strain after reheating at 70° C. for 30 minutes, solid white bars depict recovery after compressive strain at 60% ε, horizontal stripe bars depict recovery of the samples compressed to 60% strain after reheating at 70° C. for 30 minutes, and vertical stripe bars depict recovery of the samples compressed to 60% strain after heating at 110° C. for 2.5 hours. Percent recovery was determined as a ratio of the recovered thickness to the compressive deformation.

Neat siloxane prints ("neat resin" in FIG. 6B) exhibited a small but measurable compression set at 40% (black bar) and 60% strain (white bar) when held at 70° C. for 70 hours. This thickness change was somewhat recoverable after reheating to 70° C. for 30 minutes (diagonal stripe bar, horizontal stripe bar).

The addition of 40 vol % $T_g113$ microballoons resulted in 20% reduction in thickness after compression set following the same heating schedule at 40% (black bar) and 60% strain (white bar). None of this deformation was recoverable after reheating to 70° C. for 30 min (diagonal stripe bar, horizontal stripe bar).

The addition of 40 vol % $T_g44$ microballoons resulted in 45% and 57% reduction in thickness, following the same heating schedule at 40% (black bar) and 60% strain (white bar), respectively. The structure with $T_g44$ microballoons experienced noticeable recovery upon reheating, recovering 10-15% thickness at 70° C. for 30 min (diagonal bar, horizontal bar). Complete thickness recovery was observed upon reheating to 110° C. for 2.5 hours (vertical bar). The ability to retain a compressed shape after thermally soaking and cooling and then recover the original shape upon unconfined reheating is a property associated with shape memory polymers (SMPs).

Figure 6C:
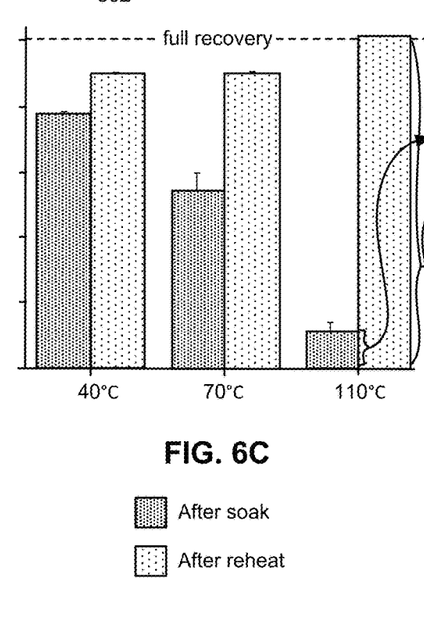
FIG. 6C is a bar graph of shape memory recovery of a 3D printed structure of matrix+$T_g$44 microballoons at temperatures near $T_g$ and above $T_g$, according to various approaches.

Looking to FIG. 6C, shape recovery of the 40 vol % $T_g44$ microballoon print structures was dependent on soak and reheat temperatures. The dark shaded bars show percent recovery after compressed soak, "after soak." The light shaded bars show percent recovery after reheating, "after reheat." The 40° C. treatment included a thermal soak at 40° C. with a strain of 60% ε for 10 minutes (dark shaded bar) followed by reheating at 40° C. for 48 hours (light shaded bar). Some shape memory recovery was demonstrated.

The 70° C. treatment included a thermal soak at 70° C. with a strain of 60% ε for 10 minutes (dark shaded bar) followed by reheating at 70° C. for 51 hours (light shaded bar). There was significantly more compression at 70° C. compared to the 40° C. treatment as well as shape memory recovery.

The 110° C. treatment included a thermal soak at 110° C. with a strain of 60% ε for 10 minutes (dark shaded bar) followed by reheating at 110° C. for 2.5 hours (light shaded bar). The higher temperature of thermal soak demonstrated greater compression (dark shaded bar) resulted in full shape recovery of the original shape following reheating (light shaded bar).

For both the 70° C. and 110° C. treatments, the first shape recovery effect was most pronounced at temperatures above the glass transition temperature, $T_g$, of the microballoons (in the case of FIG. 6C, the $T_g$ is 44° C.).

Figure 6D:
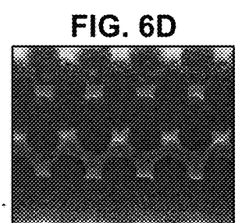
FIG. 6D is an optical microscopy image of the initial state of a 3D printed structure of matrix+$T_g$44 microballoons, according to one approach.
Figures 6E, 6F:
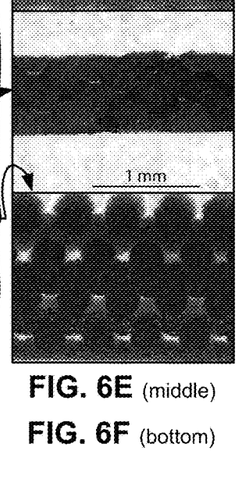
FIG. 6E is an optical microscopy image of the compressed state of a 3D printed structure of matrix+$T_g$44 microballoons, according to one approach.
FIG. 6F is an optical microscopy image of the recovered state of a 3D printed structure of matrix+$T_g$44 microballoons, according to one approach.

As shown in the optical images of FIGS. 6D-6F, shape recovery of the 40 vol % $T_g$44 microballoon print structures, as graphically depicted in the 110° C. treatment of FIG. 6C, was evidenced by recovery of structural porosity and retention of microballoon spherical shape. FIG. 6D shows the initial state of a 40 vol % $T_g$44 microballoon print structure before compression. FIG. 6E (middle image) shows the specimen cross section after compressed soak at 110° C. at 60% ε for 10 minutes. FIG. 6F shows the recovered state of the 40 vol % $T_g$44 microballoon print structure after reheating at 110° C. for 2.5 hours.

FIG. 7 is a plot of storage modulus (Pa) as a function of temperature of a cast structure formed with matrix+$T_g$44 microballoons (i.e. 40 vol % $T_g$44 microballoon structure). As shown in FIG. 7, at temperatures between 100° C. and 110° C., there was a pronounced reduction in storage modulus thereby representing a shape memory actuation of the cast 40 vol % $T_g$44 microballoon structure.

In Use

Various embodiments described herein may be used in protective gear which deforms/activates at body temperatures, in cushions and pads deployed in small and or complicated spaces, in complex structures requiring shape memory behavior (elastomer and microballoon in conjunction with 3D printing), etc.

For example, the material described herein may be used in a helmet or shoe inserts or any other cushioning element where a customized fit is desired. The material may be heated, fit around a custom mold (e.g. a person's head or foot), and then the form may be cooled back to use temperature, thereby creating a custom form-fitting cushion.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents

What is claimed is:

1. A product, comprising:
    a porous three-dimensional printed polymer structure having elastomeric shape memory, wherein the structure includes a material comprising a plurality of gas-filled microballoons,
    wherein the structure has hierarchical porosity.

2. The product as recited in claim 1, wherein the structure is a face-centered tetragonal printed structure.

3. The product as recited in claim 1, wherein the gas-filled microballoons have a glass transition temperature in a range of about room temperature to about 200° C.

4. The product as recited in claim 1, wherein the gas-filled microballoons have a glass transition temperature of less than 60° C.

5. The product as recited in claim 1, wherein a concentration of gas-filled microballoons in the material is in a range of about 20 vol % to about 50 vol % relative to a total volume of the material.

6. The product as recited in claim 1, wherein the structure has at least 97% shape memory behavior compared to an original shape of the structure.

7. The product as recited in claim 1, wherein the structure has at least 80% shape memory behavior compared to an original shape of the structure.

8. The product as recited in claim 1, wherein the structure following recovery from compression has a structural porosity being at least 80% of the structural porosity before compression.

9. An ink for additive manufacturing, the ink comprising:
    a matrix material;
    a filler; and
    a plurality of gas-filled microballoons, wherein the microballoons are glass transition temperature-specific microballoons configured to cause an elastomeric shape memory of a structure formed with the ink.

10. The ink as recited in claim 9, wherein a concentration of the plurality of gas-filled microballoons is in a range of about 20 volume % to about 60 volume % of total volume of ink.

11. The ink as recited in claim 9, wherein the gas-filled microballoons have a glass transition temperature in a range of about room temperature to about 200° C.

12. The ink as recited in claim 9, wherein the plurality of gas-filled microballoons comprise isobutane.

13. The ink as recited in claim 9, wherein the plurality of gas-filled microballoons comprise a shell having copolymer material.

14. The ink as recited in claim 9, wherein the plurality of gas-filled microballoons comprise a shell having polymer material.

15. The ink as recited in claim 9, wherein the matrix material is selected from the group consisting of: rubbery polymers, siloxane, polysiloxane, polyolefins, polyurethanes, fluorinated olefins, polyethers, polyether copolymers, poly-n-butyl acrylate, poly-ethyl acrylate, poly-n-butyl acrylate copolymer, and poly-ethyl acrylate copolymer.

16. The ink as recited in claim 9, wherein the filler is a nanosilica filler.

17. A method comprising:
- extruding a mixture comprising a matrix material, a filler, and a plurality of gas-filled microballoons through a nozzle for forming a structure having hierarchical porosity; and
- curing the mixture in the formed structure to at least a predefined extent wherein the curing includes heating at a temperature for a duration of time.

18. The method as recited in claim 17, wherein the extruding includes direct ink writing.

19. The method as recited in claim 17, wherein the formed structure is a face centered tetragonal 3D structure.

20. The method as recited in claim 17, wherein the curing includes a purge with inert gas at the temperature.

21. The method as recited in claim 17, wherein the mixture includes a curing agent.

\* \* \* \* \*